Feb. 18, 1936. F. G. TABORSKY 2,031,016
METHOD OF AND APPARATUS FOR TESTING ELECTRICAL DEVICES
Filed April 13, 1932
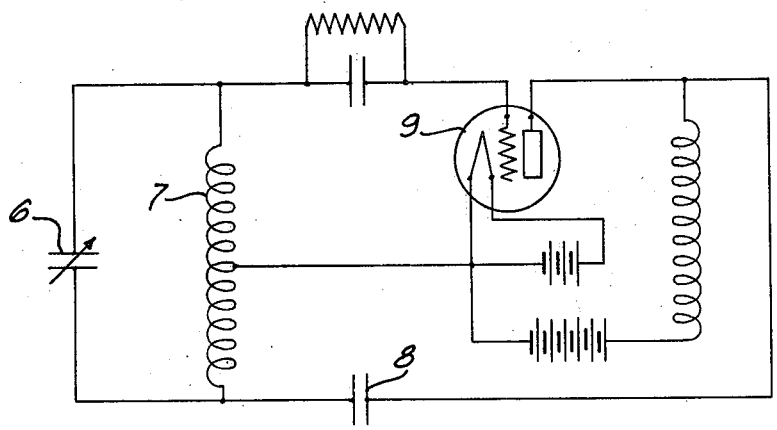
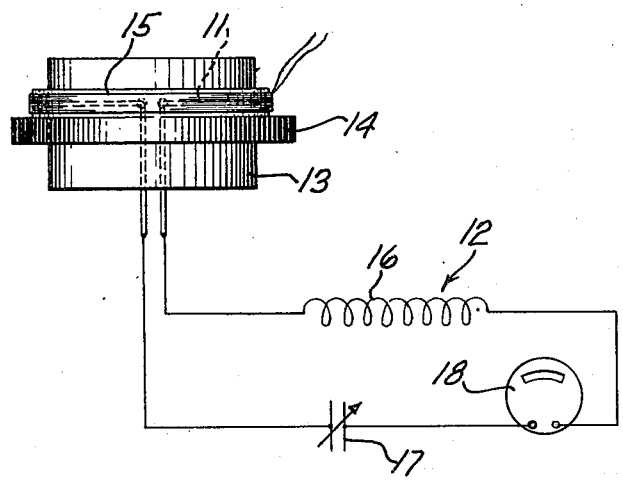
Inventor
F. G. Taborsky
By H. A. Whitehorn Att'y.

Patented Feb. 18, 1936

2,031,016

UNITED STATES PATENT OFFICE 2,031,016

METHOD OF AND APPARATUS FOR TESTING ELECTRICAL DEVICES

Frank G. Taborsky, Bellwood, Ill., assignor to Western Electric Company, Incorporated, New York, N. Y., a corporation of New York Application April 13, 1932, Serial No. 604,213

8 Claims. (Cl. 175—183)

This invention relates to a method of and apparatus for testing electrical devices and more particularly to a method of and apparatus for determining the presence of short-circuited turns in coils.

Objects of the invention are to provide an effective and efficient method of and apparatus for testing electrical devices.

In accordance with one embodiment of the invention, an oscillator is provided which is tuned to the natural frequency of the coil to be tested. This coil is loosely coupled to the oscillator and a harmonic frequency is set up which is different from the frequency of the coil and oscillator. The coil is also closely coupled to a frequency meter which is tuned to the harmonic frequency. If the coil has a short-circuited turn or turns, the harmonic frequency will be suppressed to such a degree as to prevent the energization of the frequency meter; however, if the coil has no short-circuited turn, the frequency meter will respond to indicate that the coil is free from short-circuited turns.

It is believed that a complete understanding of the invention may be had by reference to the following description taken in conjunction with the accompanying drawing, in which the single figure is a diagrammatic illustration of an apparatus embodying the invention.

Referring now in detail to the drawing, a conventional oscillator is shown having a resonant circuit comprising a variable condenser 6 and an inductance coil 7. This resonant circuit is coupled at one side through a condenser 8 to the anode circuit of a vacuum tube 9 and at the other side through a grid leak to the grid of the vacuum tube. The frequency of the electromagnetic oscillations sent out by coil 7 may be adjusted by adjusting the variable condenser 6.

Loosely coupled to the coil 7 of the oscillator is a coil 11 of a frequency meter 12. This coil consists of a single turn and is wound upon a cylindrical tube 13. Immediately underneath the coil 11, the tube is provided with a ring 14 of any suitable insulating material, which serves as a ledge for receiving a coil 15 which is to be tested. Coil 11 of the frequency meter is loosely coupled to the inductance coil 7 of the oscillator. In practice it has been found convenient to have the axes of the coils 7 and 11 parallel, but in different planes and spaced apart a distance to make the coefficient of coupling between the coils rather low. As an example of the type of coil which the apparatus is particularly well suited to test, there is illustrated a voice coil 15 of a loud speaker unit. These coils are usually wound of high resistance material. The fact that the coil is made of high resistance material, together with the fact that in many cases only a partial or high resistance short circuit exists which must be detected, makes it difficult to determine the presence of short circuited turns by ordinary means. The frequency meter may be a conventional wave meter having an inductance 16 and variable capacity 17 associated with a thermo-couple meter 18.

The operation of the apparatus is as follows:

A coil 15 is placed over the end of tube 13 and upon the ledge 14 of the frequency meter. The oscillator has previously been adjusted to oscillate at the natural frequency of coil 15. The adjustment having once been made need not be disturbed as long as similar coils are being tested. The oscillator and coil 15 are tuned to substantially the same frequency, and a harmonic frequency is produced which is different from the fundamental frequency of the oscillator and coil 15. The frequency meter is preferably tuned to be responsive to the second harmonic frequency. The tuning of the frequency meter does not have to be changed as long as similar coils are being tested.

On account of the difference in tuning between the frequency meter and the oscillator, the meter 18 will give no indication as long as the coil 15 is not associated with the meter. When a coil 15 is placed in close proximity to the coil 11 of the frequency meter, the energization of coil 15 at its fundamental frequency in effect increases the coupling between the oscillator and the coil 11 for the second harmonic, and a current will be set up to energize meter 18, provided there are no short-circuited turns in the coil. If any short-circuited turns are present, the effect will be to suppress the second harmonic frequency by absorbing a substantial portion of the energy received from the oscillator, thereby tending to shield the coil 11 from the influence of the electromagnetic oscillations of the oscillator.

While a particular theory of operation of the apparatus has been set forth, it will be evident that the invention is not dependent on the particular theory of operation advanced and the constructional details of the invention disclosed are sufficient to practice the invention.

It will be understood that the nature and embodiment of the invention herein described and illustrated is merely illustrative and that many changes and modifications may be made therein without departing from the spirit and scope of the invention.

What is claimed is:

1. An apparatus for testing electrical devices, comprising an oscillator tuned to substantially the frequency of the device being tested, a wave responsive device coupled to said oscillator and tuned to a harmonic frequency, and means associated with said wave responsive device for indicating the presence of a closed circuit in the device being tested.

2. An apparatus for testing a coil, comprising a tuned oscillator, a frequency responsive device loosely coupled to said oscillator and tuned to a frequency substantially twice that of the oscillator and means associated with said frequency responsive device for determining the presence of a closed circuit in a coil associated with said frequency responsive device.

3. An apparatus for testing a coil, comprising a source of electromagnetic oscillations tuned to the natural frequency of the coil to be tested, and means coupled therewith and tuned to a harmonic frequency for indicating an electrical condition of the coil.

4. An apparatus for testing a coil, comprising an oscillator, means for varying the frequency of the oscillator, a frequency responsive device coupled therewith, means for rendering said device responsive to a frequency substantially twice the frequency of the oscillator, and an indicating means associated with said frequency responsive device for indicating an electrical characteristic of said coil.

5. An apparatus for testing a coil, comprising means for exciting a coil to be tested at its natural frequency, and means magnetically coupled to said exciting means for indicating an electrical characteristic of the coil.

6. A method of determining a characteristic of a coil which comprises exciting the coil at its natural frequency, and measuring a resultant frequency to determine the presence of short-circuited turns of the coil.

7. A method of determining a characteristic of a coil which comprises inducing a high frequency current in the coil at a resonant frequency thereof, and determining a characteristic of the coil from a harmonic frequency.

8. An apparatus for testing an electrical device, comprising means for generating an oscillating current, a tuned circuit coupled therewith but unresponsive to the frequency of the current of said generating means, and means including the device being tested for energizing said tuned circuit at a frequency higher than the generated frequency to determine a characteristic of the device.

FRANK G. TABORSKY.